United States Patent [19]

Moss

[11] Patent Number: 4,790,613

[45] Date of Patent: Dec. 13, 1988

[54] HOLOGRAPHIC DISPLAY PANEL FOR A VEHICLE WINDSHIELD

[75] Inventor: Gaylord E. Moss, Marina del Rey, Calif.

[73] Assignee: Hughes Aircraft Company, Los Angeles, Calif.

[21] Appl. No.: 790

[22] Filed: Jan. 6, 1987

[51] Int. Cl.$^4$ .................... G02B 5/32; G03H 1/00
[52] U.S. Cl. ........................ 350/3.7; 350/3.85; 350/174
[58] Field of Search .............. 350/3.7, 174, 3.85

[56] References Cited

U.S. PATENT DOCUMENTS 3,560,921  2/1971  Lopez .................. 350/3.85
3,848,974  11/1974  Hosking et al. .......... 350/174
4,643,515  2/1987  Upatniehs .............. 350/3.85

FOREIGN PATENT DOCUMENTS 60-191847  9/1985  Japan .

OTHER PUBLICATIONS

Holography with Guided Optical Waves, Applied Physics 21, 55–63 (1980).

*Primary Examiner*—Bruce Y. Arnold
*Attorney, Agent, or Firm*—Leonard A. Alkov; A. W. Karambelas

[57] ABSTRACT

An improved hologram display panel for a vehicle is provided. Sensors can monitor the operating characteristics of the vehicle and virtual images of indicators can be realized by the illumination of holographic images that are contained in substantially transparent hologram members laminated to the surface of the windshield. The holographic images are virtual image displays that can appear offset from the windshield to accommodate the vision of the driver. A hologram barrier means may be provided to prevent activation of the hologram display by ambient light.

29 Claims, 2 Drawing Sheets

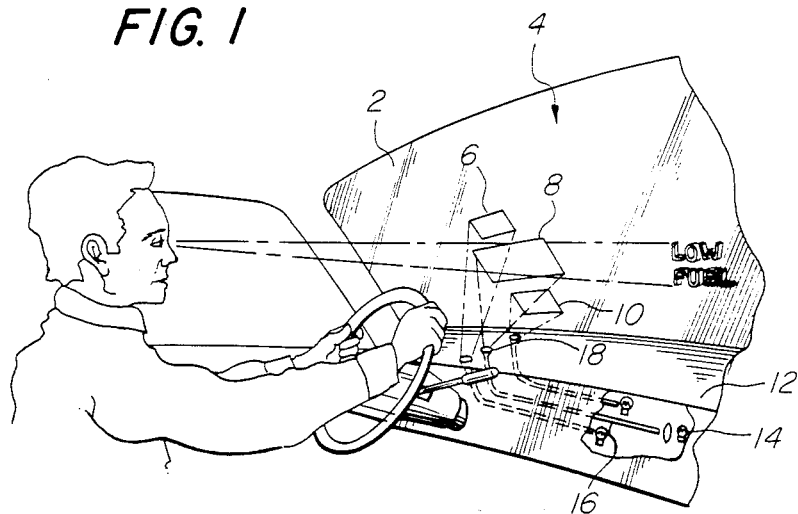
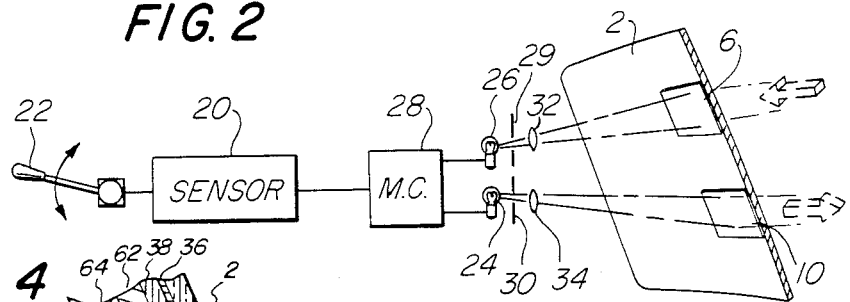
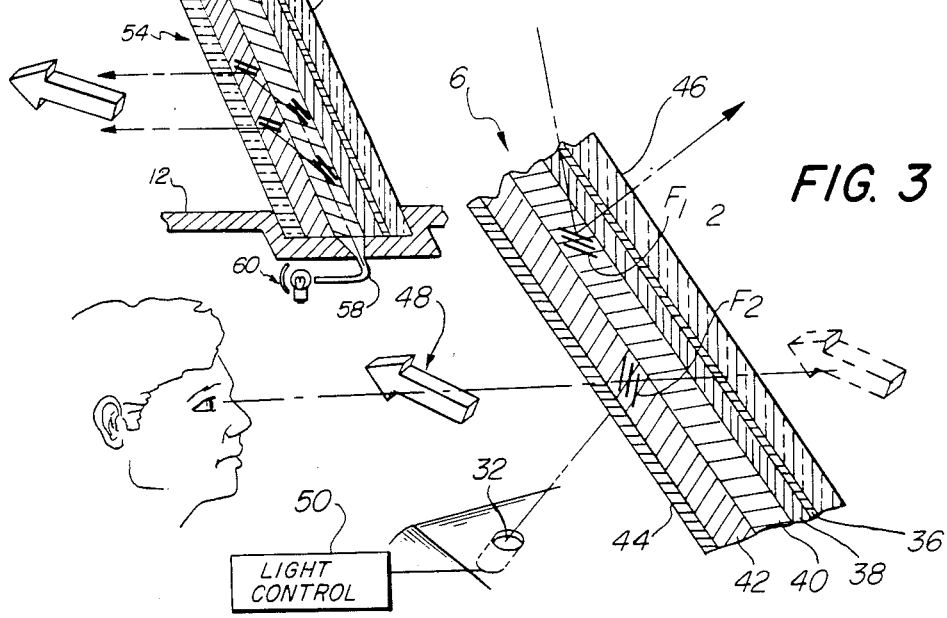

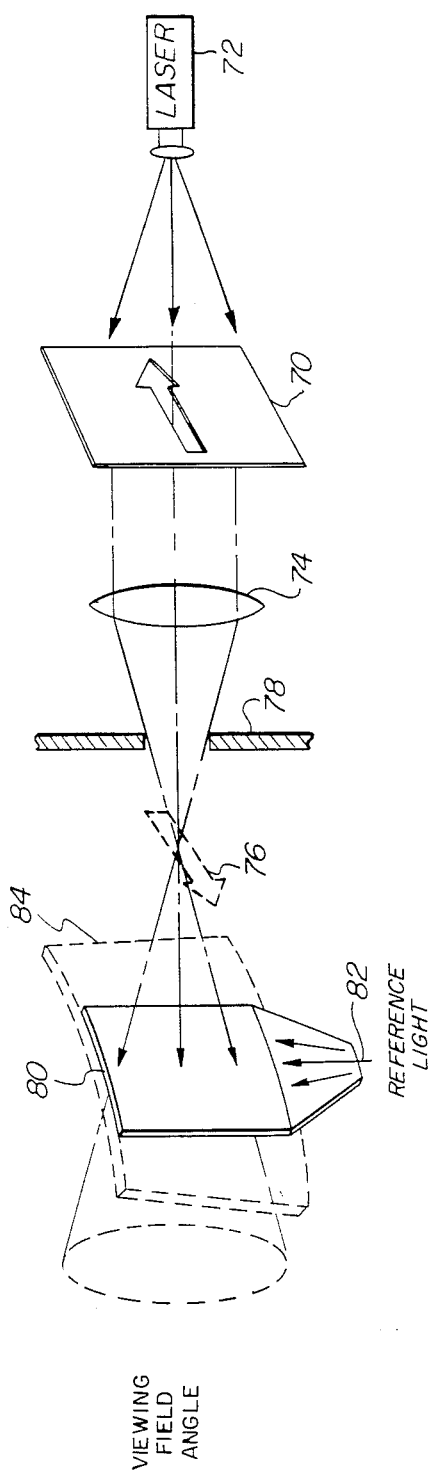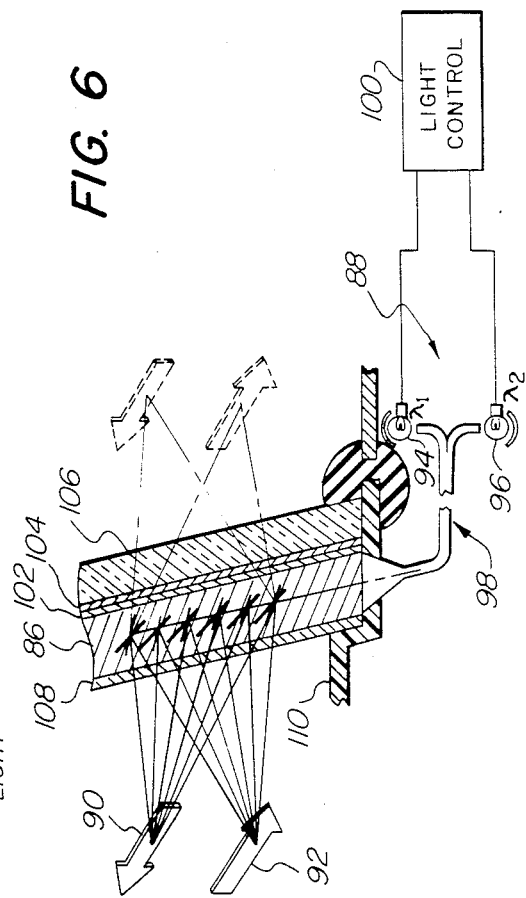

HOLOGRAPHIC DISPLAY PANEL FOR A VEHICLE WINDSHIELD

BACKGROUND OF THE INVENTION

1. Field of the Invention

The present invention relates to a display panel that can be superimposed on the viewing window for the driver of a mechanized object and, more particularly, to a display panel that includes laminated hologram members bearing a predetermined indicia indicative of a specific status of the operating condition of a vehicle that can be subjectively displayed within the line of sight of the driver.

2. Description of Related Art

Aircraft have utilized heads-up displays (HUD) that utilize cathode ray tubes with conventional optical elements and holographic mirrors to integrate status information on the operating condition of the aircraft into the line of sight of a pilot. These HUD systems are relatively complex and expensive and examples can be seen in U.S. Pat. Nos. 4,447,182 and 3,885,095.

The automobile industry has been forced to provide vehicles of a more compact design to meet the fuel efficiency requirements of the federal government. Automobiles have become more automated and numerous operating conditions and optional features can be electronically monitored to provide information to the driver. The necessity of the driver to look down and view a display panel, traditionally mounted within the dashboard, requires him to divert his line of sight from the control of the vehicle. Additionally, the population of America is maturing and a common characteristic of an industrialized, maturing population is a problem in near-sightedness. Thus, an older driver who is viewing objects at a distance can sometimes have a problem in focusing on a display panel that, because of the compact condition of modern automobiles, is relatively close to his eyes.

While it has been recognized in high-tech aircraft that an optimum position for providing certain operating conditions and functions is to position it directly within the line of sight of a pilot, the ability to provide a highly reliable but relatively inexpensive display system is still being sought by the prior art in the field of vehicles.

SUMMARY OF THE INVENTION

An improved display panel for a vehicle having a windshield is provided. Conventional sensors can be used to monitor the operating characteristics of the vehicle that is desired to be displayed to the operator. A substantially transparent hologram member or members is preferably laminated to the interior surface of the windshield. The transmission hologram member can include one or more predetermined holographic images in an indicator holographic film layer. Each image can be representative of a wavefront of a predetermined indicia whose virtual image, when realized, can appear to be positioned at a predetermined location, e.g., offset from the windshield, when appropriately illuminated by a reconstruction light beam of specific angular and/or wavelength characteristics. The hologram member can have dual film layers of holographic material. For example, a second film layer can carry an image that can act as a barrier to thereby isolate the indicator holographic image from activation by stray ambient light. Fiber optic members can carry the light from a light source to a projection lens for subjective realization of the indicator images. A microcomputer can be utilized to control the illumination of the images on an automatic basis.

In one preferred form of the invention, the hologram member can be lighted on one edge to provide the reconstruction reference beam within the boundaries of the holographic film layer to illuminate a desired image.

The foregoing and other objects, advantages and features of the present invention will become apparent from the following description taken in conjunction with the accompanying drawings which illustrate a specific embodiment of the invention.

BRIEF DESCRIPTION OF THE DRAWINGS

In the accompanying drawings:

FIG. 1 shows a perspective schematic of a driver and windshield display panel of the present invention;

FIG. 2 discloses an illustrated schematic of the operation of the present invention;

FIG. 3 shows a schematic cross-sectional view of a portion of FIG. 2;

FIG. 4 shows a schematic cross-sectional view of an embodiment of the invention with edge lighting;

FIG. 5 discloses a schematic view of a construction of a hologram for edge lighting; and FIG. 6 discloses a schematic cross-sectional view of another embodiment of the invention with edge lighting.

In the following description, like parts are designated by like reference numbers through the several drawings.

DETAILED DESCRIPTION OF THE PREFERRED EMBODIMENTS

The following description is provided to enable any person skilled in the optical and automotive fields to make and use the invention, and sets forth the best modes contemplated by the inventor of carrying out his invention. Various modifications, however, will remain readily apparent to those skilled in the art since the generic principles of the present invention have been defined herein specifically to provide a relatively economical and easily manufactured hologram display panel for a vehicle windshield.

Referring to FIG. 1, a schematic illustration of a vehicle windshield 2 with a hologram display system 4 is shown. While the preferred embodiment is described in relationship to a vehicle such as a car or a truck, it should be appreciated that the present invention defines the term "vehicle" to encompass other mechanized apparatus that utilize a driver who controls the movement of the apparatus and requires the display of operating characteristics of the apparatus. Thus aircraft, boats, trains, etc., can benefit from the present invention and a vehicle is utilized as a generic term to describe the relationship of an apparatus supporting a substantially transparent protective device permitting the operator's line of sight to view the operation of the vehicle, and also the interface with a hologram display system to provide indicators of the status of the operation of the vehicle.

Referring to FIG. 1, the windshield 2 can have, laminated on its interior surface, hologram members 6, 8 and 10 for providing indications of the status of certain monitored operating characteristics of the vehicle. The hologram means depicted herein discloses three separate hologram members laminated to the interior surface of the windshield 2. As can be appreciated, one large transparent hologram member or a series of small hologram members can be utilized to achieve the purposes of the present invention. Mounted on the dashboard 12 are projection illumination devices which can comprise a light source 14 interconnected with a port in the dashboard by a fiber optic 16. A projection lens 18 can provide the predetermined angular orientation of the light beam so that it is capable of reconstructing any holographic images contained in its particular hologram member.

In FIG. 1, the symbol LOW FUEL is disclosed as the status indicia of a hologram 8 in an exaggerated enlarged size within the line of sight of the driver. Additionally, the LOW FUEL indicator is a virtual image display that appears at a distance, offset and to the exterior, of the windshield 2. This is of particular advantage in compact vehicles with older drivers who have deteriorating close vision making them far-sighted. Thus, even though the driver would not be able to clearly focus on a real image in the plane of the holograph member 8, since the holographic image contained in the hologram member 8 is a wavefront of an image from an object that has been displaced at a distance, this virtual image will be recreated and will appear within the focusing range of the driver. As can be appreciated the virtual image can be created within or outside a plane of the windshield and can further be tilted or inclined to a plane of the windshield to create the desired effect.

Referring to FIG. 2, a schematic of the display panel system is illustrated wherein a sensor 20 can monitor an operating condition such as the position of a turn indicator lever 22. Usually the turn indicator lever 22 will have a neutral position with a right and left position indicating the activation of a right or left turn signal. The sensor 20 can determine the status of the turn indicator lever either by an electromechanical interface with the switch or, more appropriately, by monitoring the light signal to the appropriate indicator. The sensor 20 can convey this information either directly by a hard wire connection to a light source 24 or 26, or through a microcomputer system 28 that can monitor a number of different sensors, and both prioritize and direct the activation of various light sources, such as 24 and 26, to automatically control the illumination of the appropriate hologram image to provide the desired indicia within the line of sight of the driver. In FIG. 2, the microcomputer system 28 is shown having an input port connected to the sensor 20 and output ports connected, respectively, to the light sources 24 and 26. The output beams of the light sources 26 and 24 have respective apertures 28 and 30, and projection lenses 32 and 34. Thus the light source 26 provides a reconstruction light beam at a predetermined angular position to impact hologram member 6 to provide a left turn signal indicator, while light source 24 provides a reconstruction light beam to impact on hologram member 10 to provide a right turn signal indicator. As can be seen in FIG. 2, these signal indicators are virtual images that can appear in a space exterior of the windshield 2.

As can be readily appreciated, numerous different operating characteristics of the vehicle or mechanized apparatus can be appropriately monitored. Thus conventional engine indicators such as overheat, low brake fluid, oil pressure, generator status, etc., can be shown in addition to radio, air conditioner controls, clocks, etc. The hologram members can be made in various colors to match standard automobile practice such as warning indicators of a red color, highbeam indicators of a blue color, and directional turn signals of a green color. As shown in FIG. 1, the underdash components can be minimized through the use of displaced light sources that are interconnected with fiber optics.

It should also be realized that the hologram members can be mounted, as shown in FIG. 1, as separate hologram members or can be on a single hologram member as separate layers, or even separate holograms recorded in the same layer. In the case of recording the various status indicators in the same layer of holographic material, the hologram image selection could either be by different angle of light orientation or a different wavelength of light from the illuminator.

As can be readily appreciated, the holographic elements mounted on the windshield will be transparent except when activated by the reconstruction beam of a specific angular characteristic or wavelength. The indicia indicative of the status of the operating characteristic of the vehicle can be displayed in a three dimensional format and the present invention can be implemented at a relatively minimal cost and weight when compared to the previous head-up displays utilized in aircraft. Thus, mass production of high-tech hologram display panels can be utilized in automobiles and other vehicles.

Referring to FIG. 3, the hologram member 6 is displayed in a cross-sectional configuration laminated by optical cement 36 to the interior of the windshield 2. A substantially transparent substrate 38 can support a first holographic film layer 40 that can carry a guard or barrier holographic image illustrated as the fringes F1 to provide a reflection of exterior light, such as light ray 46, that could inadvertently realize the desired holographic image erroneously. A second holographic film layer 2 carries a holographic image shown as F2, which is the left-hand signal indicator 48. The signal indicator 48 is realized as appearing exteriorly of the windshield member 42 when the reconstruction light beam is projected by the lens 32 as a result of light control system 50, and it is only shown in FIG. 3, and the other FIGS. on the left-hand interior space of the windshield for illustration purposes of being seen by the driver's eyes only. An actual image is not realized at those locations but is instead perceived exteriorly, as shown by the dotted arrows, by the driver. A protective layer 52 of an abrasive resistant material that can also protect against moisture completes the hologram member 6. By itself, the holographic film layers 40 and 42 can be formed of conventional holographic film coatings, such as poly-N-vinyl carbazole or a dichromatic gelatin. The specific holographic materials are known in the prior art and can be found in reference material, such as "Topics in Applied Physics," Vol. 20, "Holographic Recording Materials" by H. M. Smith, Springer Verlag, Berlin, Germany 1977. Additionally, background on holographic procedures can be found in "Optical Holography" by Collier et al., Academic Press, New York, N.Y. (1971).

Referring to FIG. 4, an embodiment of the present invention is disclosed wherein the hologram member 54 can be lit along an edge to thereby prevent any blocking of the line of sight of projection optics, such as utilized in the embodiment of FIGS. 1 through 3. As can be seen in FIG. 4, the hologram member 54 is laminated to the windshield 2 so that it extends beneath the dashboard 12. The relative scale of the schematic is exaggerated for illustration purposes since the holographic film layers are about 30 microns in thickness. As with the embodiment of FIG. 3, optical cement 36 such as an epoxy sold as Epotek 302-2 made by Epoxy Technology Corp., Mass. can be utilized to bond a transparent substrate 38, such as mylar, to the interior surface of the windshield 2 and a protective abrasion resistant coating 44, such as silicon dioxide, can be applied to complete the hologram member 54. The reflective holographic film layer 56 has its edge connected to a coupling with a fiber optic member 58 that can be subjectively illuminated through a light source 60 contained beneath the dashboard with a reflector element 62. The indicia holographic film layer 64 can then be subjectively illuminated through the side edge lighting to realize the virtual image recorded in that layer that is indicative of a specific predetermined status desired to be viewed by the operator. The advantage of the side or edge lighting in the embodiment of FIG. 4 prevents any obstruction of any projection light that was necessary in the embodiment of FIGS. 1 through 3.

FIG. 5 discloses the construction of a single layer hologram in a schematic diagram for illustration purposes. The predetermined indicia member 70 can be back lit by source light 72 to provide a source object, such as an arrow. A lens member 74 can focus the object to create a real image in space 76. An aperture member 78 can define the viewing aperture that is desired, for example, it may be desirable to limit the display to only the driver, in accordance with the SAE standard eyellipse for 99% of the drivers. The holographic layer 80 can be illuminated with a reference light beam 82 to develop the image as diffraction gratings within the holographic layer 80. In this embodiment, the reference light beam 82 is directed within a plane of the holographic layer to interface with the source image to record the interference pattern of the wavefront. The reference light beam 82 will travel within the boundaries of the holographic layer 80 in the lengthwise direction shown in FIG. 5. By using edge lighting to introduce a reference beam numerous advantages can be realized. For example, the hologram can be mounted as a display and lit by one edge that will not be inadvertently blocked by exterior objects and remote illumination can be used.

To compensate for any distortion of the virtual image, the holographic layer 80 can be physically configured to assume the envelope of the window member 84 prior to the development of holographic interference fringes. Thus, the potential image distortion problem of a curved windshield can be taken into account and neutralized.

As can be seen in FIG. 6, the virtual image of an object can be realized when a reconstruction reference beam of the same wavelength as the reference light beam is introduced by edge lighting of the hologram layer 86 through a fiber optic system 88. The actual virtual images can be offset from a plane of the hologram or even tilted to extend through the hologram member at an angle. Thus, the hologram member provides a design option of locating the virtual images at the focusing depth of the observer regardless of the location of the display or even the inclination of the display. In determining the bandwidth of a reference light beam, there is tradeoff with the desired degree of resolution of the virtual image. That is, the larger the bandwidth, the less resolution.

The embodiment of the invention shown in FIG. 6 has a composite holographic image pattern developed in a single holographic layer 86 through the use of different source images 90 and 92 that have been developed by reference light beams of different wavelengths $\lambda_1$ and $\lambda_2$, as known in this art.

Thus, a first light source 94 of $\lambda_1$ can be linked by a fiber optic coupler system 98 to the hologram layer 86 and a second light source 96 of $\lambda_2$ can be linked by the fiber optic coupler system 98 to the holographic layer 86 to selectively realize the respective images 90 and 92 through a light control member 100. The holographic layer 86 can be mounted on a transparent substrate 102 and laminated to a windshield 106 by optical cement 104. An abrasive resistant film coat 108 can seal and protect the holographic layer 86. The hologram member can be mounted in a dashboard 110 as shown in FIG. 6.

As can be readily appreciated, the present invention can be installed in newly manufactured cars and integrated in the windshield, or can be provided in a retrofit kit comprising the light mechanisms, attachments to the conventional sensors mounted on the vehicle and appropriate hologram decals providing the advantages of the present hologram display panel system. The hologram members can be relatively inexpensive when mass produced with substantially little weight addition to the vehicle. They also do not occupy any substantial space in the interior of the vehicle and will not mar the aesthetic design of the car. As mentioned, the hologram display system of the present invention can produce virtual images that can be outside of the plane of the windshield which are of a particular advantage in accommodating the vision demands of a more mature driving population.

Various modifications to the above described invention may be readily apparent to those skilled in the optical display and automotive fields in view of the above described generic concepts. Therefore, the scope of the present invention should be interpreted solely from the following claims.

What is claimed is:

1. An improved display panel for a vehicle having a windshield comprising:
   means for monitoring an operating characteristic of the vehicle;
   means for providing an indication of the status of the vehicle operating characteristic including a substantially transparent hologram member mounted adjacent and in the line of sight of the windshield and having a predetermined indicia indicative of the specific status, the transparent hologram member includes an indicia of a virtual image that appears to be realized at a location offset and exterior of the windshield to facilitate viewing by far-sighted drivers, and
   means to illuminate the indicia indicative of a certain corresponding status.

2. The invention of claim 1 wherein the means for monitoring includes a sensor member and the means for providing an indication includes means for determining the status of the sensor and activating a corresponding illumination of a hologram member indicative of that status.

3. The invention of claim 1 wherein the hologram member includes a transparent flexible substrate suitable for lamination to a windshield, a first film layer of a holographic material recording the image and a protective exterior coating to provide abrasive resistance.

4. The invention of claim 3 wherein the hologram member includes a second film layer of holographic material supporting a second image to reflect stray light to prevent inadvertent activation of the image in the first film layer.

5. The invention of claim 1 wherein the means for illuminating includes a fiber optic connector and a light source at one end of the fiber optic connector.

6. An improved windshield and display panel combination for providing an indication of the operating conditions of certain functions of a vehicle to the driver with virtual images, comprising:
  means for providing an indication of the status of the operating condition with a number of substantially transparent hologram members laminated to the windshield to provide a plurality of predetermined holographic images, each image representative of a wavefront of a predetermined indicia whose virtual image is realized as appearing offset from the windshield and to the exterior of the windshield when appropriately illuminated; and
  means for illuminating the holographic images to indicate the operating condition, wherein the hologram members while configured to simulate the curvature of the windshield location to which they are to be laminated.

7. The invention of claim 6 wherein the means for illuminating includes a fiber optical link, a source light and a projection lens.

8. The invention of claim 6 wherein the hologram members have dual film layers of holographic material.

9. An improved display panel system for a vehicle having a windshield comprising:
  means for monitoring operating characteristics of the vehicle;
  hologram means for providing an indication of the status of the monitored operating characteristics including a substantially transparent hologram member laminated to the windshield to provide a plurality of predetermined holographic images, each image representative of a wavefront of a predetermined indicia whose virtual image is realized as appearing offset from the windshield when appropriately illuminated;
  hologram barrier means for isolating each holographic image from activation by ambient light; and
  means for illuminating the holographic indicia images in response to the monitoring means with reconstruction light beams of predetermined angular characteristics.

10. An improved display panel system for a vehicle having a windshield comprising:
  means for monitoring operating characteristics of the vehicle;
  hologram means for providing an indication of the status of the monitored operating characteristics including a substantially transparent hologram member laminated to the windshield to provide a plurality of predetermined holographic images, each image representative of a wavefront of a predetermined indicia whose virtual image is realized when appropriately illuminated; and
  means for illuminating the holographic indicia images in response to the monitoring means with reconstruction light beams that are transmitted from an edge of the hologram member through the hologram member.

11. The invention of claim 10 wherein the vehicle has a mounting member, such as a dashboard member, adjacent one surface of the windshield and the hologram member is laminated so that a bottom edge of the hologram member extends beneath a surface of the dashboard member and the means for illuminating is connected to the edge of the hologram member beneath the surface of the dashboard member.

12. The invention of claim 10 wherein the means for monitoring includes a sensor member and the means for providing an indication includes means for determining the status of the sensor and activating a corresponding illumination of a hologram member indicative of that status.

13. The invention of claim 10 wherein the transparent hologram member includes an indicia of a virtual image that appears to be realized at a location offset from the windshield.

14. The invention of claim 10 wherein the hologram member includes a transparent flexible substrate suitable for lamination to a windshield, a first film layer of a holographic material recording the image and a protective exterior coating to provide abrasive resistance.

15. The invention of claim 10 wherein the means for illuminating includes a fiber optic connector and a light source at one end of the fiber optic connector.

16. The invention of claim 10 wherein the hologram member has a characteristic of recording the image while configured to simulate the curvature of the windshield location to which it is to be laminated.

17. In a holographic display system for activating a virtual image, the improvement comprising:
  a substantially transparent hologram member within the visible spectrum of light having a developed holographic image representative of a wavefront of a predetermined indicia whose virtual image is activated when appropriately illuminated by a reconstruction reference beam;
  hologram barrier means for isolating the holographic image from activation by ambient light, and
  means for illuminating the holographic image to activate the virtual image.

18. The invention of claim 17 wherein the virtual image is a reflective surface.

19. The invention of claim 17 wherein the virtual image is a predetermined indicia that is realized by the reference beam.

20. The invention of claim 17 wherein a composite holographic image is provided and the means for illumination includes different wavelengths of reference beams to activate different portions of the composite holographic image.

21. The invention of claim 17 wherein the means for illuminating includes a fiber optical coupling system that is attached to the edge of the hologram member.

22. The invention of claim 17 further including means for removing any distortion of any mounting of the hologram member on a non-planar surface.

23. An improved display panel for a vehicle having a windshield comprising:
  means for monitoring an operating characteristic of the vehicle;
  means for providing an indication of the status of the vehicle operating characteristic including a substantially transparent hologram member mounted adjacent and in a line of sight through the windshield and having a predetermined indicia indicative of the specific status, wherein the hologram member includes a transparent flexible substrate suitable for lamination to a windshield, a first film layer of a holographic material recording the image and a second film layer of holographic material to reflect stray light to prevent inadvertent activation of the image in the first film layer, and means to illuminate the hologram indicia indicative of a certain corresponding status.

24. The invention of claim 23 wherein the hologram member includes a protective exterior coating to provide abrasive resistance.

25. The invention of claim 23 wherein the means for illuminating includes a fiber optic connector and a light source at one end of the fiber optic connector.

26. The invention of claim 23 wherein the hologram member is recorded while configured to simulate the curvature of the windshield location to which it is to be laminated.

27. An improved display panel system for a vehicle having a windshield comprising:
   means for monitoring operating characteristics;
   hologram means for providing an indication of the status of the monitored operating characteristics including a substantially transparent hologram member laminated to the windshield to provide a plurality of predetermined holographic images, each image representative of a wavefront of a predetermined indicia whose virtual image is realized when appropriately illuminated, wherein the hologram member includes a transparent flexible substrate suitable for lamination to a windshield, a first film layer of a holographic material for recording the images, and a second film layer of holographic material to reflect stray light to prevent inadvertent activation of the images in the first film layer, and
   holographic means for illuminating the holographic indicia images in response to the monitoring means with reconstruction light beams that are transmitted from an edge of the hologram member through the hologram member to contact the holographic images.

28. The invention of claim 27 wherein the means for monitoring includes a sensor member and the means for providing an indication includes means for determining the status of the sensor and activating a corresponding illumination of a hologram member indicative of that status.

29. The invention of claim 27 wherein the transparent hologram member includes an indicia of a virtual image that appears to be realized at a location offset from the windshield.

* * * * *